(12) United States Patent
Ravishankar et al.

(10) Patent No.: US 7,868,104 B2
(45) Date of Patent: Jan. 11, 2011

(54) CRYSTALLIZABLE PROPYLENE COPOLYMERS

(75) Inventors: Periagaram Srinivasan Ravishankar, Kingwood, TX (US); Weiguo Hu, Hadley, MA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 197 days.

(21) Appl. No.: 11/924,979

(22) Filed: Oct. 26, 2007

(65) Prior Publication Data

US 2009/0149613 A1 Jun. 11, 2009

(51) Int. Cl.
*C08F 4/72* (2006.01)
(52) U.S. Cl. ..................................... 526/112
(58) Field of Classification Search .................. 526/112
See application file for complete search history.

(56) References Cited

U.S. PATENT DOCUMENTS

| | | | |
|---|---|---|---|
| 5,346,925 A * | 9/1994 | Sugano et al. | ............... 521/54 |
| 5,504,172 A | 4/1996 | Imuta et al. | |
| 5,936,053 A | 8/1999 | Fukuoka et al. | |
| 5,989,725 A * | 11/1999 | Bullard et al. | ............. 428/516 |
| 6,388,040 B1 | 5/2002 | Fujita et al. | |
| 6,525,157 B2 | 2/2003 | Cozewith et al. | |
| 6,552,149 B2 | 4/2003 | Alastalo et al. | |
| 6,627,723 B2 | 9/2003 | Karandinos et al. | |
| 2003/0083515 A1 | 5/2003 | Rodriguez | |

FOREIGN PATENT DOCUMENTS

| | | |
|---|---|---|
| EP | 1 514 896 | 3/2005 |
| EP | 1 614 699 | 11/2006 |
| FI | 70028 | * 12/1986 |
| JP | 09012635 | 1/1997 |
| WO | WO 2006/009951 | 1/2006 |
| WO | WO 2006/010139 | 1/2006 |

OTHER PUBLICATIONS

R. Quijada et al., "Synthesis and properties coming from the copolymerization of propene with α-olefins using different metallocene catalysts," Polymer, 2005, vol. 46, pp. 1567-1574.

* cited by examiner

*Primary Examiner*—Ling-Siu Choi
*Assistant Examiner*—Sonya Wright

(57) ABSTRACT

A propylene copolymer is described comprising at least 70 mol % of units derived from propylene, up to 30 mol % of units derived from a combination of ethylene, at least one alpha-olefin having from 4 to 10 carbon atoms, such that the molar ratio of ethylene-derived units to said alpha-olefin-derived units in said combination is from about 1:9 to about 9:1, and from 0 to about 3 mol % of units derived from a copolymerizable diene. The copolymer has isotactically arranged propylene derived sequences, an overall heat of fusion as determined by differential scanning calorimetry (DSC) of less than 65 J/g, a second melting point as determined by DSC of less than 100° C., less than one 1,3 insertion error per 1000 carbon atoms and a weight average molecular weight as determined by gel permeation chromatography (GPC) of from about 100,000 to about 500,000.

5 Claims, No Drawings

CRYSTALLIZABLE PROPYLENE COPOLYMERS

BACKGROUND OF THE INVENTION

1. Field of the Invention

This invention relates to crystallizable copolymers of propylene and to a process for producing the same.

2. Description of the Related Art

Propylene polymers exhibit a wide variety of commercial utility because of their excellent mechanical properties and optical properties. For example, propylene homopolymers have excellent rigidity, surface hardness, heat resistance, glossiness and transparency, and hence are used for various industrial parts, containers, films and non-woven fabrics. In addition, propylene/ethylene random copolymers containing small amounts of ethylene units exhibit excellent transparency, rigidity, surface hardness, heat resistance and heat-sealing properties, and, hence, are used for films, containers, etc. With larger concentrations of ethylene units, propylene/ethylene random copolymers exhibit elastomeric properties and show excellent impact absorption, heat resistance and heat-sealing properties, and, hence, are used in films as well as modifiers for thermoplastic resins.

For example, U.S. Pat. No. 5,504,172 discloses a propylene elastomer comprising 50 to 95% by mol of propylene units and 5 to 50% by mol ethylene units. The elastomer is prepared using a bridged indenyl transition metal catalyst in which each indenyl group is substituted at the 4 and 7 positions by a $C_2$ to $C_{20}$ alkyl group and is bridged by a divalent hydrocarbyl or silyl group.

Further, U.S. Pat. No. 6,525,157 discloses a propylene copolymer comprising 95 to 75% by weight of propylene-derived units and 5 to 25% by weight of ethylene-derived units, the copolymer having (a) a melting point of less than 90° C.; (b) a relationship of elasticity to 500% tensile modulus such that $$\text{Elasticity} \leq 0.935M + 12,$$

where elasticity is in percent and M is the 500% tensile modulus in MPa; and (c) a relationship of flexural modulus to 500% tensile modulus such that $$\text{Flexural Modulus} \leq 4.2e^{0.27M} + 50,$$

where flexural modulus is in MPa and M is the 500% tensile modulus in MPa. The copolymer is produced using a bridged indenyl transition metal catalyst, such as $\mu$-$(CH_3)_2$Si(indenyl)$_2$ M(Cl)$_2$, where M is Zr, Hf or Ti.

In addition to copolymers with ethylene, copolymers of propylene with higher alpha-olefins have also been extensively studied and have been found to exhibit useful properties. For example, in an article entitled "Synthesis and properties coming from the copolymerization of propene with $\alpha$-olefins using different metallocene catalysts," polymer, 46, 1567-1574 (2005), Quijada et al. report on studies of the copolymerization of propene with 1-hexene and 1-octadiene using a variety of iso- and syndioselective metallocene catalysts. Noted in this article is the tendency for the crystallinity of the copolymer to decrease with the degree of incorporation of the higher alpha-olefin, which results in a lower Tg material and hence an increase in the low temperature impact properties of the product.

For elastomeric applications, another important property in determining the impact properties of a copolymer is the weight average molecular weight of the copolymer, with higher molecular weight copolymers generally being preferred. However, with many of the metallocene catalysts used to produce copolymers of propylene with higher alpha-olefins, the generation of 1,3 insertion errors during the polymerization process tends to limit chain propagation. As a result, most existing processes for producing propylene/higher alpha-olefin copolymers result in relatively low molecular weight materials. Whereas these materials often provide excellent properties for use in adhesive applications, their low molecular weight may limit their utility as elastomers.

In accordance with the present invention, a novel product and process has now been developed in which the incorporation of small quantities (up to 30 mol %) of ethylene-derived units in a propylene/$C_4$ to $C_{10}$ alpha-olefin copolymer allows the production of a propylene terpolymer with high molecular weight and some isotactic crystallinity at high catalyst efficiency. The resultant terpolymer has less than one 1,3 insertion error per 1000 carbon atoms (as indicated by the substantial absence of any peak in the vicinity of 27.5 ppm in the $^{13}$C-NMR spectrum of the polymer) and exhibits excellent properties for use as an elastomer.

U.S. Pat. No. 6,388,040 discloses a propylene/ethylene/$\alpha$-olefin terpolymer characterized in that i) there is from 0.01 mol % to less than 15 mol % of a comonomer unit with a molar ratio of ethylene units/$C_4$-$C_{20}$ $\alpha$-olefin units being in the range of from $6.5 \times 10^{-4}$ to 0.99, and from more than 85 mol % to not more than 99.99 mol % of a propylene unit with 2,1- and 1,3-propylene units being in the range of from 0 to 1 mol %, in a polymer chain determined by $^{13}$C-NMR spectroscopy; ii) a weight average molecular weight (Mw) determined by GPC is in the range of from 40,000 to 1,000,000; and iii) the amount of the component eluted in o-dichlorobenzene at a temperature of not higher than 40° C. is not more than 10% by weight based on the total weight of the terpolymer and the amount of the component eluted in o-dichlorobenzene within the +10° C. range of an elution peak temperature is not less than 75% by weight based on the weight of the component eluted at a temperature of higher than 0° C. The terpolymer is produced using a supported catalyst comprising bridged dicyclopentadienyl compound and typically has a melting point (Tm) ranging from 100° C. to 160° C.

U.S. Pat. No. 6,552,149 discloses a film-making terpolymer of propylene, comprising a mixture of different propylene terpolymer compositions and further comprising comonomer units derived from ethylene and at least one $C_4$ to $C_8$ alpha-olefin, the weight ratio of ethylene to the $C_4$ to $C_8$ alpha-olefin(s) being less than 0.3 and the hexane solubles fraction being less than 6.5% calculated from the total weight of the terpolymer. The terpolymer can be produced using a bridged metallocene catalyst and can contain from 1 to 10 wt % of ethylene and from 5 to 25 wt % of other alpha-olefins although, for the preparation of films and similar articles, the terpolymer preferably contains 0.3 to 3 wt % of ethylene-derived units and 1 to 15 wt % of the units derived from other alpha-olefins.

U.S. Pat. No. 6,627,723 discloses an adhesive poly-alpha olefin interpolymer comprising components: (A) from 60 to 94 mol % of units derived from one alpha mono-olefin having from 3 to 6 carbon atoms; (B) from 6 to 40 mol % of units derived from one or more other mono-olefins having from 4 to 10 carbon atoms and at least one carbon atom more than (A); and (C) optionally from 0 to 10 mol % of units derived from another copolymerizable unsaturated hydrocarbon, different from components (A) and (B), such as ethylene; wherein (i) the diad distribution of component (A) in the interpolymer as determined by $^{13}$C NMR divided by the calculated Bernoullian diad distribution is less than 1.07; and (ii) the storage modulus G' of the interpolymer determined on cooling, measured at 1 Hz, intersects 3×10⁵ Pa at an intersection temperature of less than 85° C. The interpolymer has a weight average molecular weight as determined by GPC of less than 120,000, preferably less than 90,000, and a heat of fusion of 5 to 40 J/g as determined by DSC and is useful as an adhesive.

Japanese Patent Application Publication No 9-012635 discloses a propylene/1-butene/ethylene elastomer, which is alleged to have excellent transparency, rigidity and heat sealability, and which comprises 50-85 mol % units derived from propylene, 5-50 mol % units derived from 1-butene and 10-40 mol % units derived from ethylene, wherein (1) the amount of the units derived from 1-butene is larger than that of the units derived from ethylene, (2) the intrinsic viscosity as measured in decalin at 135° C. is 0.1-12 dl/g, and (3) the molecular weight distribution (Mw/Mn) as determined by gel permeation chromatography (GPC) is 3 or below. The elastomer is produced by using a catalyst containing a metallocene compound.

European Patent Publication No. EP 1 614 699 A1 discloses a propylene elastomer comprising (a) 50 to 85 mol % units derived from propylene, (b) 5 to 25 mol % units derived from 1-butene and (c) 10 to 25 mol % units derived from ethylene, and having a molar ratio of propylene content to ethylene content of from 89/11 to 70/30 and a modulus in tension (YM), as measured in accordance with JIS 6301, of not more than 40 MPa.

SUMMARY OF THE INVENTION

In one aspect, the invention resides in a propylene copolymer comprising at least 70 mol % of units derived from propylene, up to 30 mol % of units derived from a combination of ethylene and at least one alpha-olefin having from 4 to 10 carbon atoms such that the molar ratio of ethylene-derived units to said alpha-olefin-derived units in said combination is from about 1:29 to about 29:1, and from 0 to about 3 mol % of units derived from a copolymerizable diene, said copolymer having isotactically arranged propylene derived sequences, an overall heat of fusion as determined by differential scanning calorimetry (DSC) of less than 65 J/g, a second melting point as determined by DSC of less than 100° C., less than one 1,3 insertion error per 1000 carbon atoms and a weight average molecular weight as determined by gel permeation chromatography (GPC) of from about 100,000 to about 500,000.

Conveniently, the molar ratio of ethylene-derived units to said alpha-olefin-derived units in said combination is from about 1:9 to about 9:1, such as from about 1:5 to about 5:1.

Conveniently, said copolymer comprises up to 20 mol % of units derived from said combination of ethylene and at least one alpha-olefin having from 4 to 10 carbon atoms.

Conveniently, said copolymer comprises from about 1 to about 10 mol % of units derived from ethylene.

Conveniently, said copolymer has a second melting point less than 75° C. and an overall a heat of fusion as determined by DSC of less than 50 J/g.

In one embodiment, said at least one alpha-olefin is octene-1.

In a further aspect, the invention resides in a process of producing the propylene copolymer of said one aspect, the process comprising:

(a) preparing a monomer mixture comprising propylene, ethylene, at least one alpha-olefin having from 4 to 10 carbon atoms, and optionally a copolymerizable diene; and (b) effecting polymerization of said monomer mixture under polymerization conditions in the presence of a catalyst system comprising a metallocene compound having the formula:

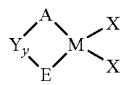

wherein

M is a Group 3, 4, 5 or 6 transition metal atom, or a lanthanide metal atom, or actinide metal atom;

A is a substituted or unsubstituted polycyclic arenyl ligand pi-bonded to M;

E is a substituted or unsubstituted polycyclic arenyl ligand pi-bonded to M;

Y is an optional bridging group that is bonded to E and A, and is present when y is one and absent when y is zero;

y is zero or one; and each X is a univalent anionic ligand, or two X are joined and bound to the metal atom to form a metallocycle ring, or two X are joined to form a chelating ligand, a diene ligand, or an alkylidene ligand.

Conveniently, (b) is effected by solution polymerization.

In one embodiment, each of A and E is a substituted or unsubstituted indenyl ligand. Conveniently, A and E are the same.

In one embodiment, Y is present and is a bridging group containing boron or a Group 14, 15 or 16 element.

Conveniently, M is hafnium.

In one embodiment, the metallocene compound is dimethylsilylbisindenylhafnium dimethyl and the catalyst system further includes a fluoroarylborate activator.

DEFINITIONS

As used herein, the numbering scheme for the Periodic Table Groups is the new notation as set out in CHEMICAL AND ENGINEERING NEWS, 63(5), 27 (1985).

For purposes of this specification, a polymer or oligomer is referred to as comprising an olefin, the olefin present in the polymer or oligomer is the polymerized or oligomerized form of the olefin, respectively. Likewise the use of the term polymer is meant to encompass homopolymers and copolymers. In addition the term copolymer includes any polymer having 2 or more monomers.

As used herein, the term "polycyclic arenyl ligand" is used herein to mean a substituted or unsubstituted monoanionic $C_8$ to $C_{103}$ hydrocarbyl ligand that contains an aromatic five-membered hydrocarbyl ring (also referred to as a cyclopentadienyl ring) that is fused to one or two partially unsaturated, or aromatic hydrocarbyl ring structures which may be fused to additional saturated, partially unsaturated, or aromatic hydrocarbyl rings. Polycyclic arenyl ligands include substituted or unsubstituted, partially unsaturated or aromatic indenyls, pentalenyls, pentapentalenyls, fluorenyls, cyclopentanaphthyls, heterocyclopentaindenyls, and heterobenzocyclopentaindenyls.

The terms "hydrocarbyl radical," "hydrocarbyl" and "hydrocarbyl group" are used interchangeably throughout this document. Likewise the terms "group," "radical," and "substituent" are also used interchangeably in this document.

For purposes of this disclosure, "hydrocarbyl radical" is defined to be a radical, which contains hydrogen atoms and carbon atoms and which may be linear, branched, or cyclic, and when cyclic, aromatic or non-aromatic.

The term "catalyst system" is defined to mean a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety.

The transition metal compound may be neutral as in a precatalyst, or a charged species with a counter ion as in an activated catalyst system.

Catalyst precursor is also often referred to as precatalyst, catalyst, catalyst compound, catalyst precursor, transition metal compound or transition metal complex. These words are used interchangeably. Activator and cocatalyst are also used interchangeably. A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound, also referred to as an alkylated invention compound.

Noncoordinating anion (NCA) is defined to mean an anion either that does not coordinate to the catalyst metal cation or that does coordinate to the metal cation, but only weakly. A NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon.

A stoichiometric activator can be either neutral or ionic. The terms ionic activator, and stoichiometric ionic activator can be used interchangeably. Likewise, the terms neutral stoichiometric activator, and Lewis acid activator can be used interchangeably.

DETAILED DESCRIPTION OF THE INVENTION

The present invention provides an elastomeric propylene copolymer and a process for producing the same, in which the copolymer comprises at least 70 mol % of units derived from propylene, up to 30 mol % of units derived from a combination of ethylene and at least one alpha-olefin having from 4 to 10 carbon atoms, preferably 1-octene, such that the molar ratio of ethylene-derived units to said alpha-olefin-derived units in said combination is from about 1:29 to about 29:1. The copolymer optionally further comprises from 0 to about 3 mol % of units derived from a copolymerizable diene, such as 5-vinyl-2-norbornene (VNB).

The copolymer is produced using a particular metallocene catalyst system such that the final copolymer comprises isotactically arranged propylene derived sequences, an overall a heat of fusion as determined by differential scanning calorimetry (DSC) of less than 65 J/g, a second melting point as determined by DSC of less than 100° C., less than one 1,3 insertion error per 1000 carbon atoms and a weight average molecular weight (LALLS Mw) as determined by gel permeation chromatography (GPC) of from about 100,000 to about 500,000.

Monomers

The composition of monomer mixture employed in the present process can vary widely but typically includes at least 70 mol %, such as at least 80 mol %, propylene, and up to 30 mol %, such as up to 20 mol % of a combination of ethylene and at least one $C_4$ to $C_{10}$ alpha olefin, wherein the molar ratio of ethylene to total amount of $C_4$ to $C_{10}$ alpha olefin is from about 1:29 to about 29:1. The precise composition of the monomer mixture required to produce a give copolymer will depend on the desired composition of the copolymer and the reaction conditions, and can be readily determined by anyone of ordinary skill in the art.

The at least one $C_4$ to $C_{10}$ alpha olefin employed in the monomer mixture is typically selected from 1-butene, 1-hexene and 1-octene and generally is 1-octene.

In one embodiment, the monomer mixture also includes at least one copolymerizable diene present in an amount up to 3 mol % of the overall monomer mixture. Suitable dienes include 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), ethylidene norbornene (ENB), and combinations thereof, with VNB being preferred.

Process for Producing the Copolymer

Any known polymerization process may be used to produce the present copolymer. Suitable polymerization methods include high pressure, slurry, gas, bulk, suspension, supercritical, solution phase, or a combination thereof. Solution phase polymerization is, however, preferred. Similarly, the polymerization conditions are not closely controlled but generally include at a temperature range of about 20 to about 200° C., a pressure of about 50 to about 2000 psi (about 350 to 14000 kPa) and residence time of about 5 to about 15 minutes.

The polymerization is conducted in the presence of a catalyst system comprising at least one metallocene catalyst compound and a non-coordinating anion activator. The at least one metallocene catalyst compound comprises a compound of the formula:

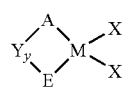

wherein

M is a Group 3, 4, 5 or 6 transition metal atom, or a lanthanide metal atom, or actinide metal atom, and preferably is hafnium;

A is a substituted or unsubstituted polycyclic arenyl ligand, typically a substituted or unsubstituted indenyl ligand, pi-bonded to M;

E is a substituted or unsubstituted polycyclic arenyl ligand, typically a substituted or unsubstituted indenyl ligand, pi-bonded to M;

Y is an optional bridging group that is bonded to E and A, and is present when y is one and absent when y is zero;

y is zero or one; and each X is a univalent anionic ligand, or two X are joined and bound to the metal atom to form a metallocycle ring, or two X are joined to form a chelating ligand, a diene ligand, or an alkylidene ligand.

In one embodiment, Y is present and is a bridging group containing boron or a Group 14, 15 or 16 element. Examples of suitable bridging groups include S, O, NR', PR', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a C$_1$-C$_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group Y include S, O, NPh, PPh, CH$_2$, CH$_2$CH$_2$, CH(CH$_3$)$_2$, SiMe$_2$, SiPh$_2$, SiMePh, Si(CH$_2$)$_3$, and Si(CH$_2$)$_4$.

Conveniently, the ligands A and E are the same so that, for example, one suitable metallocene compound is rac-(dimethylsilyl)bisindenylhafnium dimethyl.

In addition to the metallocene component(s), the catalyst system employed in the present process comprises a non-coordinating anion (NCA) activator. As used herein the term "non-coordinating anion" means an anion that does not coordinate to a transition metal cation thereby remaining sufficiently labile to be displaced by a neutral Lewis base. "Compatible" NCAs are those which are not degraded to neutrality when the initially formed complex decomposes. Further, the anion will not transfer an anionic substituent or fragment to the cation so as to cause it to form a neutral four coordinate metallocene compound and a neutral by-product from the anion. NCAs are preferably those which are compatible, stabilize the metallocene cation in the sense of balancing its ionic charge, yet retain sufficient lability to permit displacement by an ethylenically or acetylenically unsaturated monomer during polymerization. Additionally, the anions used are typically large or bulky in the sense of having sufficient molecular size to inhibit or prevent neutralization of the metallocene cation by Lewis bases other than the polymerizable monomers that may be present in the polymerization process. Typically the anion will have a molecular size of greater than or equal to about 4 angstroms. NCA-generating activators of the type described in European Patent No. EP277004 are particularly useful in the present process.

In one embodiment, the non-coordinating anion activator may be represented by the following formula:

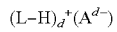

wherein

L is an neutral Lewis base;

H is hydrogen;

(L–H)$^+$ is a Bronsted acid;

A$^{d-}$ is a non-coordinating anion having the charge d-; and d is an integer from 1 to 3.

The cation component, (L–H)$_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The anion component A$^{d-}$ include those having the formula [M$^{k+}$Q$_n$]$^{d-}$ wherein k is an integer from 1 to 3; n is an integer from 2-6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ also include diboron compounds as disclosed in U.S. Pat. No. 5,447,895, which is fully incorporated herein by reference.

Illustrative, but not limiting examples of suitable activators include N,N-dimethylanilinium tetra-(perfluorophenyl)borate, N,N-dimethylanilinium tetrakis-(perfluoronapthyl)borate, N,N-dimethylanilinium tetrakis-(perfluorobiphenyl)borate, N,N-dimethylanilinium tetrakis-(3,5-bis(trifluoromethyl)phenyl)borate, triphenylcarbenium tetrakis-(perfluoronapthyl)borate, triphenylcarbenium tetrakis-(perfluorobiphenyl)borate, triphenylcarbenium tetrakis-(3,5-bis(trifluoromethyl)phenyl)borate, and triphenylcarbenium tetra-(perfluorophenyl)borate.

Propylene Copolymer

The present copolymer comprises at least 70 mol %, such as from about 70 mol % to about 99 mol %, for example from about 80 mol % to about 99 mol %, of units derived from propylene, up to 30 mol %, such as from about 1 mol % to about 30 mol %, for example from about 1 mol % to about 20 mol %, of units derived from a combination of ethylene and said at least one alpha-olefin having from 4 to 10 carbon atoms, wherein the molar ratio of ethylene-derived units to said alpha-olefin-derived units in said combination is from about 1:29 to about 29:1, such as from about 1:9 to about 9:1, typically from about 1:5 to about 5:1. Generally, the copolymer contains from about 1 to about 10 mol % of units derived from ethylene and from about 1 to about 29 mol % of units derived from said at least one alpha-olefin.

The copolymer optionally further comprises from 0 to about 3 mol % of units derived from a copolymerizable diene, such as 5-vinyl-2-norbornene (VNB).

The copolymer has an overall a heat of fusion as determined by differential scanning calorimetry (DSC) of less than 65 J/g, typically less than 50 J/g, and a second melting point as determined by DSC of less than 100° C., typically less than 75° C.

Differential scanning calorimetric (DSC) data referred to herein were obtained using a DSC 2920 Differential Scanning Calorimeter from TA Instruments or a Perkin Elmer 7

Series Thermal Analysis System. Samples weighing approximately 5-10 mg were sealed in aluminum sample pans. The DSC data were recorded by first cooling the sample to −100° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion. The melting temperatures reported here were obtained during both the first and second heating. When there is more than one melting peak during the first heating, the higher temperature melting peak is referred to as the "second melting point as determined by DSC".

The present copolymer is substantially free of any peak in the vicinity of 27.5 ppm in the $^{13}$C-NMR spectrum of the polymer (typically in the range of 27.4 ppm to 27.7 ppm), which peak is normally indicative of 1,3 insertion errors. In this respect, it is to be appreciated that in a propylene-containing polymer, the individual propylene units normally insert 1,2 or head to tail. The insertion of propylene can, however, also occur to a small extent by either 2,1 (tail to tail) or 1,3 insertions (end to end). The amounts of these insertion errors can be determined from $^{13}$C-NMR spectrum of the polymer and in particular the amount of the 1,3 insertion errors can be determined by measurement of the βγ peak. As discussed in U.S. Pat. Nos. 5,504,172 and 7,026,404, the entire contents of which are incorporated herein by reference, two structures can contribute to the βγ peak: (1) a 1,3 insertion of a propylene monomer; and (2) a 2,1-insertion of a propylene monomer followed by two ethylene monomers. The amount of these errors can be determined by dividing the area of the βγ peak (resonance in the range of 27.4 ppm to 27.7 ppm) by the sum of all the methyl group peaks and ½ of the area of the βγ peak. The present copolymer generally includes less than one 1,3 insertion error for every 1,000 carbon atoms in the copolymer.

In addition, the present copolymer typically has a weight average molecular weight as determined GPC of from about 100,000 to about 500,000, such as from about 125,000 to about 250,000, and a ratio of weight average molecular weight (Mw) to number average molecular weight (Mn), of about 1.7 to about 2.5.

Typically, the present copolymer also has a branching index (BI) of about 1.0 indicating that the copolymer is generally linear. Calculating BI requires a series of three laboratory measurements of polymer properties in solutions as disclosed in VerStrate, Gary, "Ethylene-Propylene Elastomers," encyclopedia of polymer science and engineering, 6, 2$^{nd}$ edition (1986). These are: (i) $M_{w, \, GPC \, LALLS}$, weight average molecular weight measured using a low angle laser light scattering (LALLS) technique in combination with Gel Permeation Chromatography (GPC), (ii) weight average molecular weight ($Mw_{DRI}$) and viscosity average molecular weight ($Mv_{DRI}$) using a differential refractive index (DRI) detector in combination with GPC and (iii) intrinsic viscosity (IV) measured in decalin at 135° C. The first two measurements (i and ii) are obtained in a GPC using a filtered dilute solution of the copolymer in 1,2,4-trichlorobenzene.

The branching index (BI) is defined as:

$$BI = \frac{M_{v,br} \times M_{w,DRI}}{M_{w,GPC \, LALLS} \times M_{v,GPC \, DRI}}$$

where, $M_{v,br}=(IV/k)^{1/a}$; and "k" and "a" are the Mark-Houwink constants (a=0.759 and k=0.000246 for ethylene, propylene diene elastomeric polymers in decalin at 135° C.). From this equation it follows that the branching index for a linear polymer is 1.0. For branched polymers, the extent of branching is defined relative to the linear polymer. Since at a constant number average molecular weight $M_n$, $(M_W)_{branch}$>$(M_W)_{linear}$, BI for branched polymers is less than 1.0, and a smaller BI value denotes a higher level of branching. In place of measuring IV in decalin, it is also acceptable to measure IV using a viscosity detector in tandem with DRI and LALLS detectors in the so-called GPC-3D instrument. In this case, "k" and "a" values appropriate for the GPC solvent should be used in the equation above.

Uses of the Copolymer

The present copolymer can be used alone or in combination with any number of known additives in a variety of applications including films and sheets, various injection-molded parts, various containers, pipes, fibers and the like. By virtue of high weight molecular weight of the present copolymer, the resultant products exhibit high rigidity and impact resistance.

Suitable additives for use with the present copolymer include, for example, antioxidants such as phenol-, thioether- or phosphorus-antioxidants; ultraviolet absorbing agents; heat stabilizers; heavy metal inactivators (copper pollution inhibitors); clarifiers; antistatic agents; nucleating agents; lubricants; anti-fogging agents; flame retardants; antiblocking agents; anti-dropping agents; radical generators; colorants such as pigments, dyes; halogen scavengers; dispersing agents or neutralizing agents such as metal soaps; organic or inorganic antibacterial agents; inorganic fillers, e.g., talc, mica, clay, wollastonite, zeolite, calcium carbonate, magnesium carbonate, aluminum hydroxide, magnesium hydroxide, hydrotalcite, basic aluminum lithium hydroxycarbonate hydrate, silicon dioxide, titanium dioxide, zinc oxide, magnesium oxide, calcium oxide, zinc sulfide, barium sulfate, potassium sulfate, carbon fibers, carbon black, graphite and metallic fibers; organic fillers, e.g., wood flour, pulp, wastepaper, synthetic fibers, natural fibers; coupling agents, e.g., silane-, titanate-, boron-, aluminate- or zircoaluminate-coupling agents; and inorganic or organic fillers which are surface-treated with any of the coupling agents.

The invention will now be more particularly described with reference to the following non-limiting examples.

In the examples, metallocene polymerizations were carried out in a continuous flow stirred tank reactor (CSTR). In each case, monomers comprising propylene, ethylene, and 1-octene were mixed in varying amounts with a solvent (hexane) and delivered to the reactor as a mixed feed stream. The metallocene catalyst (rac-(dimethylsilyl)bisindenylhafnium dimethyl) and activator (N,N-dimethylanilinium tetrakis(perfluorophenyl) borate) were pre-mixed in 900 cc of toluene and delivered to the reactors with a metering pump. The production rate was measured by timed collection of a known weight of effluent and measuring the solids concentration by evaporating the solvent. From the catalyst make-up and feed rate and the production rate, the catalyst productivity was calculated as Catalyst Efficiency (g polymer/g catalyst). The molecular weight was controlled through the choice of reactor temperature, although a chain transfer agent, such as hydrogen, can also be used to facilitate molecular weight control. At the completion of the polymerization run, the reactor was opened. The process data are shown in Table 1 whereas the composition, melt flow rate (MFR) and $^{13}$C-NMR data for the copolymer products are shown in Table 2.

GPC, DSC data for the copolymer products are shown in Tables 3 and 4 respectively.

MFR data were obtained according to ASTM D-1238 at 2.16 kg weight and 230° C.

Molecular weights (number average molecular weight (Mn), weight average molecular weight (Mw), and z-average molecular weight (Mz)) were determined using a Waters 150 Size Exclusion Chromatograph (SEC) equipped with a differential refractive index (DRI) detector, an online low angle light scattering (LALLS) detector and a viscometer (VIS). The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference. Solvent for the SEC experiment was prepared by adding 6 grams of butylated hydroxy toluene (BHT) as an antioxidant to a 4 liter bottle of 1,2,4 trichlorobenzene (TCB) (Aldrich reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/ 0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

DSC data were obtained as described above and are summarized in Table 4. Reported in this Table are (i) the number of melting peaks in the first melt cycle after annealing for the indicated number of days, (ii) the glass transition temperature, Tg, (iii) the melting peaks for the first and second peak (Tm,1 and Tm,2) during the first melt cycle, (iv) the heat of fusion during the first melt (dH1), (v) the number of peaks during the freezing part of the first cycle (vi) the freezing onset (Tfo), (vii) the freezing peak temperatures (Tf,1, Tf,2 etc.), (viii) heat of fusion measured on the freezing portion, dHf, (ix) the single melting peak, if observed, on the second heating and (x) the heat of fusion for the second melt.

$^{13}$C-NMR data were collected on either a Varian VXR ($C^{13}$ frequency=75 MHz/$H^1$ frequency=300 MHz) or UnityPlus ($C^{13}$ frequency=100 MHz/$H^1$ frequency=400 MHz) equipped with a 10 mm broadband probe.

Examples 1 to 3

In Example 2 (inventive) a mixture of propylene, ethylene and 1-octene was polymerized to produce a copolymer comprising 88.2 wt % propylene-derived units, 5.2 wt % ethylene-derived units and 6.6 wt % octene-derived units (see Table 2). The copolymer had a molecular weight of over 178,000 (Table 3), a heat of fusion of 50.9 J/g (Table 4), a second melting point of 87.7° C. (Table 4), and no 1,3 insertion errors (Table 2) as evidenced by the lack of a peak in the $^{13}$C-NMR spectrum in the range of 27.5 ppm to 27.7 ppm.

In Example 3 (comparative) the polymerization process of Example 2 was repeated to produce a propylene/octene copolymer (no ethylene) with a similar concentration of propylene-derived units as in Example 2. The product had a molecular weight of only 144,000 (Table 3) a heat of fusion of 50.9 J/g (Table 4), a second melting point of 87.7° C. (Table 4), and the $^{13}$C-NMR spectrum indicated the presence of 1,3 insertion errors (Table 2).

In comparing Examples 2 and 3, it is evident that the presence of ethylene derived units is necessary to obtain high molecular weight as evidenced by both GPC Mw and the MFR measurements.

In Example 1 (comparative) the polymerization process of Example 2 was repeated to produce a propylene/ethylene copolymer (no octene) with a similar concentration of propylene-derived units as in Example 2. As will be seen from Table 3, the resultant polymer had a similarly high molecular weight as the product of Example 2, although the absence of octene in the copolymer meant that there was no independent control over the elasticity and propylene miscibility of the copolymer. In contrast, in octene-containing copolymers, such as that of Example 2, adjusting the proportions of ethylene and octene allows independent manipulation of the miscibility and elasticity of the copolymer.

Examples 4 to 7

In Example 4 (comparative), the polymerization process of Example 1 was repeated with lower feed rate of ethylene to produce a propylene-ethylene (no octene) copolymer of lower ethylene content than Example 1.

In Example 5 (inventive) the polymerization process of Example 2 was repeated but with a higher concentration of 1-octene to produce a copolymer comprising 75.3 wt % propylene-derived units, 3.7 wt % ethylene-derived units and 21 wt % octene-derived units (see Table 2). The copolymer had a molecular weight of over 138,000 (Table 3), a heat of fusion of 14.5 J/g (Table 4), a second melting point of 55° C. (Table 4), and no 1,3 insertion errors (Table 2) as evidenced by the lack of a peak in the $^{13}$C-NMR spectrum in the range of 27.5 ppm to 27.7 ppm.

In Example 6 (comparative) the polymerization process of Example 5 was repeated to produce a propylene/octene copolymer (no ethylene) with a similar concentration of propylene-derived units as in Example 5. The product had a molecular weight of only 111,000 (Table 3), a heat of fusion of 35.1 J/g (Table 4), a second melting point of 70° C. (Table 4), and the $^{13}$C-NMR spectrum included a signal at 27.6 ppm (Table 2).

Comparing the molecular weight trends of Examples 4-6 with Examples 1-3, it is clear that as the octene content in the polymer is increased, the molecular weight obtainable is lower that when there is no octene present, but still higher than when there is no ethylene present.

In Example 7 (comparative) the polymerization process of Example 6 was repeated but with an even higher level of 1-octene in the monomer mixture. The copolymer contained 23 wt % octene-derived units (see Table 2) and had a molecular weight of less than 92,000 (Table 3).

Examples 8 to 10

In Example 8 (inventive) the polymerization process of Example 2 was repeated but with the polymerization temperature being reduced from 60° C. to 45° C. The resultant copolymer had a molecular weight of over 225,000 (Table 3), a heat of fusion of 13.8 J/g (Table 4), a second melting point of 55° C. (Table 4). Comparing Examples 4, 5 and 8, it is clear that the lowering of the molecular weight due to the addition of octene can be countered by lowering the reactor temperature.

In Examples 9 and 10 (comparative) the process of Example 8 was repeated but with no ethylene in the monomer mixture. The copolymers produced had molecular weights of only 155,000 (Example 9) and 126,000 (Example 10). Thus, without the presence of ethylene, even lowering the reactor temperature to boost the molecular weight is insufficient to attain the molecular weight of Example 4.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

TABLE 1

Process Data

| Example | Total Cat rate (g/h) | Alkyl rate (g/h) | C2 rate (g/h) | C3 rate (g/h) | C8 rate (g/h) | C6 Rate (g/h) | T (°C.) | Prod. Rate (g/h) | C2 Conv | C3 Conv | C8 Conv | Cat Eff (g/g) | Cem Conc (%) |
|---|---|---|---|---|---|---|---|---|---|---|---|---|---|
| 1 | 0.00467 | 0.118 | 53.7 | 811.5 | 0 | 3564 | 60 | 350.4 | 67% | 39% |  | 75025 | 8 |
| 2 | 0.00467 | 0.118 | 27 | 811.5 | 64.35 | 3564 | 60 | 287.5 | 55% | 31% | 29% | 61557 | 6 |
| 3 | 0.00467 | 0.118 | 0 | 811.5 | 128.7 | 3564 | 60 | 188 |  | 20% | 20% | 40287 | 4 |
| 4 | 0.00583 | 0.118 | 24 | 811.5 | 0 | 3564 | 60 | 434.9 | 78% | 51% |  | 74597 | 9 |
| 5 | 0.00583 | 0.118 | 24 | 811.5 | 214.5 | 3564 | 60 | 493.6 | 75% | 46% | 48% | 84872 | 11 |
| 6 | 0.00933 | 0.118 | 0 | 811.5 | 214.5 | 3564 | 60 | 357.4 |  | 34% | 38% | 38310 | 8 |
| 7 | 0.0105 | 0.118 | 0 | 811.5 | 386.1 | 3564 | 60 | 405.3 |  | 34% | 33% | 38596 | 9 |
| 8 | 0.00583 | 0.118 | 24 | 811.5 | 214.5 | 3564 | 45 | 316.1 | 62% | 29% | 32% | 54217 | 7 |
| 9 | 0.014 | 0.118 | 0 | 811.5 | 214.5 | 3564 | 45 | 239 |  | 22% | 27% | 17069 | 5 |
| 10 | 0.01633 | 0.118 | 0 | 811.5 | 386.1 | 3564 | 45 | 300.4 |  | 25% | 25% | 18397 | 6 |

TABLE 2

Copolymer Data

| Example | Wt % C2 | Wt % C3 | Wt % C8 | MFR | Cem Conc (%) | NMR Signal at 27.4-27.7 ppm |
|---|---|---|---|---|---|---|
| 1 | 10.3 | 89.7 | 0 | 11.3 | 9.76 |  |
| 2 | 5.2 | 88.2 | 6.6 | 18.3 | 7.05 | NO |
| 3 | 0 | 86.6 | 13.4 | 75 | 4.98 | YES |
| 4 | 4.3 | 95.7 | 0 | 16.6 | 11.77 | NO |
| 5 | 3.7 | 75.3 | 21 | 104 | 13.08 | NO |
| 6 | 0 | 77 | 23 | HIGH | 9.31 | YES |
| 7 | 0 | 68 | 31.8 | HIGH | 10.97 |  |
| 8 | 4.7 | 73.3 | 22 | 19.5 | 8.6 |  |
| 9 | 0.9 | 75.3 | 23.8 | 89.4 | 6.17 |  |
| 10 | 0 | 67.5 | 32.5 | 67.5 | 255 |  |

TABLE 3

GPC-3D Data

| Example | Mw, Lalls | Mz, Lalls | Mw Dri | Mn Dri | BI | Mw/Mn | (Mw/Mn) Dri | Mz/Mw |
|---|---|---|---|---|---|---|---|---|
| 1 | 178923 | 268459 | 170012 | 80151 | 1.028 | 2.23 | 2.12 | 1.5 |
| 2 | 182149 | 264175 | 180013 | 88320 | 1.033 | 2.06 | 2.04 | 1.45 |
| 3 | 144362 | 204152 | 139403 | 75176 | 1.037 | 1.92 | 1.85 | 1.41 |
| 4 | 189932 | 288877 | 177283 | 88767 | 1.012 | 2.14 | 2.00 | 1.52 |
| 5 | 138729 | 199586 | 139388 | 75321 | 1.02 | 1.84 | 1.85 | 1.44 |
| 6 | 111185 | 160232 | 112612 | 60059 | 1.027 | 1.85 | 1.88 | 1.44 |
| 7 | 91738 | 130122 | 95726 | 55136 | 1.033 | 1.66 | 1.74 | 1.42 |
| 8 | 225213 | 321836 | 226395 | 116498 | 1.021 | 1.93 | 1.94 | 1.43 |
| 9 | 155251 | 227276 | 160467 | 84335 | 0.996 | 1.84 | 1.90 | 1.46 |
| 10 | 126079 | 178395 | 132002 | 69195 | 0.985 | 1.82 | 1.91 | 1.41 |

TABLE 4

DSC Data

| Example | # Peaks 1st melt | # days annealed | Tg °C. | Tm11 °C. | Tm12 °C. | dH1 | # Peaks freeze | Tf, o | Tf, p1 | Tf, p2 | dHf | Tm2 | dH2 |
|---|---|---|---|---|---|---|---|---|---|---|---|---|---|
| 1 | | | | | | | | | | | | | |
| 2 | 2 | 3 | -17.1 | 42.3 | 73.5 | 43.4 | 1 | 14.3 | 4.4 | | 13.4 | 74.5 | 27.7 |
| 3 | 2 | 3 | -9.7 | 43 | 87.7 | 50.9 | 1 | 62 | 26 | | 35.1 | 89.4 | 33.2 |
| 4 | | | | | | | | | | | | | |
| 5 | 2 | 3 | -22.1 | 42.9 | 55 | 14.5 | 0 | | | | | | |
| 6 | 2 | 3 | -17.1 | 41.4 | 70 | 35.1 | 1 | 10 | 0 | | 3.4 | 69.2 | 11.5 |
| 7 | 1 | 3 | -22.7 | 41.9 | | 13.5 | 0 | | | | | | |
| 8 | 2 | 3 | -23.5 | 42.5 | 55 | 13.8 | 0 | | | | | | |
| 9 | 2 | 3 | -16.3 | 41.9 | 65 | 39.4 | 2 | 10 | 0 | -15 | | 66 | 20.8 |
| 10 | 1 | 3 | -22.1 | 41.9 | | 17 | 0 | | | | | | |

What is claimed is:

1. A process for the production of a propylene copolymer, wherein the process comprises:
    (a) preparing a monomer mixture comprising propylene, ethylene, at least one alpha-olefin having from 4 to 10 carbon atoms, and optionally a copolymerizable diene; and
    (b) effecting polymerization of said monomer mixture in the presence of a catalyst system comprising dimethylsilylbisindenylhafnium dimethyl; and wherein the propylene copolymer comprises at least 70 mol % of units derived from propylene, up to 30 mol % of units derived from a combination of ethylene and at least one alpha-olefin having from 4 to 10 carbon atoms such that the molar ratio of ethylene-derived units to said alpha-olefin-derived units in said combination is from about 1:29 to about 29:1, and from 0 to about 3 mol % of units derived from a copolymerizable diene, said copolymer having isotactically arranged propylene derived sequences, an overall heat of fusion as determined by differential scanning calorimetry (DSC) of less than 65 J/g, a second melting point as determined by DSC of less than 100° C., less than one 1,3 insertion error per 1000 carbon atoms and a weight average molecular weight as determined by gel permeation chromatography (GPC) of from about 100,000 to about 500,000.

2. The process of claim 1, wherein the monomer mixture is substantially free of a copolymerizable diene.

3. The process of claim 1, wherein (b) is effected by solution polymerization.

4. The process of claim 1, wherein the catalyst system further includes a fluoroarylborate activator.

5. The process of claim 1, wherein said at least one alpha-olefin is octene-1.

* * * * *